3,271,336
VINYL ESTER COPOLYMERS
Henry Warson, Olton, Solihull, and Douglas Stuart William Dargan, Wylde Green, Sutton Coldfield, England, assignors to Dunlop Rubber Company Limited, a British company
No Drawing. Filed July 25, 1963, Ser. No. 297,666
Claims priority, application Great Britain, Aug. 3, 1962, 29,895/62
12 Claims. (Cl. 260—17.4)

This invention relates to vinyl ester copolymers.

Polyvinyl esters such as polyvinyl acetate, and copolymers of vinyl esters with other monomers having co-polymerisable carbon to carbon unsaturation such as alkyl esters of maleic, fumaric, itaconic, acrylic and methacrylic acids yield flexible films and, with the addition of pigments in stabilized emulsion, are employed as emulsion paints.

An object of the invention is to provide vinyl ester copolymers having improved water resistance.

According to the invention, we provide a copolymer of a vinyl ester, with or without another monomer co-polymerisable therewith, with a polyacetal of acrolein.

The polyacetal of acrolein is obtained by the condensation of acrolein with a polyhydric alcohol having three or more hydroxy groups in the molecule, e.g. glycerol, sorbitol or pentaerythritol; thus the condensation of acrolein with pentaerythritol gives 3,9-divinyl-bi-(metadioxane), hereinafter referred to as the spiro compound, to which the following heterocyclic six-membered ring structure may be attributed:

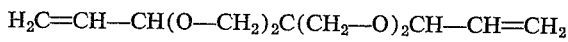

(It is to be understood that the two structures

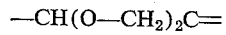

in this molecule are six-membered ring structures). The polyacetal is generally present in small amounts not exceeding 0.3 percent, and usually up to 0.1 percent, based on the total monomer weight.

The invention also includes a method for the production of a copolymer which comprises heating an aqueous emulsion of a vinyl ester, with or without another monomer co-polymerisable therewith, and a polyacetal of acrolein.

In the emulsion polymerisation of the monomers a dispersing colloid containing hydroxyl groups such as a dextrin may be employed. Dextrins have the advantage that they are inexpensive and, since they usually have lower solution viscosities than colloids normally used, such as hydroxy-methyl-cellulose and polyvinyl alcohol, the viscosity of the aqueous emulsion reaction mixture is readily controllable.

When a dispersing colloid containing hydroxyl groups is used, the polyacetal of acrolein can function not only by co-polymerising with the vinyl ester (and any other co-monomer(s) present), thus forming cross-links, but also by taking part to some extent in a trans-acetalisation reaction with the hydroxyl groups in the colloid.

Vinyl ester copolymer emulsions prepared according to the invention may be used as heat-sealable adhesives, in which there is a reduced tendency to blocking, and may also be employed as textile finishes having increased resistance to dry-cleaning solvents.

Example I

| | Part(s) |
|---|---|
| Water (city of Birmingham) | 85 |
| Dextrin, prepared from waxy sorghum starch and available as dextrin C. 8102 with 10% moisture content | 3.3 |
| Non ionic polyethylene oxide type surface active agent available as Texofor BI | 2 |
| Ammonium salt of a sulphonated ester as Lankropol AO as stabilizer | 0.5 |
| Sodium bicarbonate as stabilizer | 0.2 |
| Potassium persulphate as initiator | 0.2 |
| Vinyl acetate | 100 |
| Spiro compound | 0.1 |

The water, dextrin, surface active agent and stabilizers were stirred in a flask and the dextrin dissolved by heating. The monomers were mixed separately and 5 percent of these were added when the temperature in the flask had dropped to 50° C., followed by the initiator. The temperature was raised to, and maintained at 79°–81° C. with minimum reflux during the gradual addition of the remainder of the monomers over 5 hours after which the temperature was raised to 90° C. for 20 minutes.

The resulting emulsion had a total solids content of 55 percent, a viscosity of from 1 to 3 poises and a particle size in the range of from 0.5 to 1.5 microns.

A film of .004 inch thickness was deposited on glass from the emulsion, and a similar blank film was obtained from a similar emulsion prepared without the inclusion of the spiro compound. The films were allowed to stand for 7 days and a drop of water was placed on each film. The blank film blanched after 15 seconds whereas the film containing the spiro compound remained unblanched for 30 seconds.

Example II

An emulsion was prepared as follows:

| | Part(s) |
|---|---|
| Emulsion prepared as in Example I | 790 |
| Hexylene glycol | 53.2 |
| Pigments: | |
|     A rutile titanium dioxide available as Tioxide R–CR | 650 |
|     Micronized barytes | 200 |
|     Whiting | 150 |
| Dispersing medium stabilizer: | |
|     Water (city of Birmingham) | 557 |
|     Hydroxy ethyl cellulose available as Natrosol 250 Med. | 250 |
|     Sodium polyhexametaphosphate available as Calgon PT | 2.2 |

The pigments were dispersed in the dispersing medium with a high speed cavitation mixer followed by addition of the copolymer emulsion and hexylene glycol.

The resulting paint was applied to an asbestos panel and, after drying, was subjected to a mechanical scrub test. The coating exhibited no visible wear after 2,500 scrubs whilst a similar coating, prepared with a copolymer emulsion prepared without the spiro compound, was ruptured at two points after 2,000 scrubs.

Example III

| | Part(s) |
|---|---|
| Water (city of Birmingham) | 324 |
| Dextrin, prepared from waxy sorghum starch and available as dextrin C. 8102 | 10 |
| Non ionic polyethylene oxide type surface active agent available as Texofor BI | 8 |
| Ammonium salt of a sulphated ester available as Lankropol OA as stabilizer | 2 |
| Sodium bicarbonate as stabilizer | 0.8 |
| Potassium persulphate as initiator | 0.8 |
| Vinyl acetate | 340 |
| 2-ethylhexyl acrylate | 60 |
| Spiro compound | 0.4 |

The polymerisation was performed in a three necked flask equipped with a stirrer, a reflux condenser and a tap-funnel.

The water, dextrin, surface-active agent and stabilizers were stirred in the flask and the dextrin dissolved by heating to 90° C. The three monomers were mixed separately and 5 percent of these were added when the temperature in the flask had dropped to 60° C., followed by the initiator. The temperature was raised to, and maintained at 79°–81° C. with minimum reflux during the gradual addition through the tap-funnel of the remainder of the monomers over 5 hours after which the temperature was raised to 90° C. for 20 minutes.

A film of the vinyl ester copolymer prepared was formed by coating a sheet of glass with the emulsion resulting from the above and was found to have markedly improved water resistance to a film prepared in similar manner from a vinyl ester copolymer prepared as above with the omission of the spiro compound, as shown by a test similar to that in Example I. In this case, the blank film blanched after 30 seconds, whilst the film containing the spiro compound blanched only after 3 to 4 minutes.

Example IV

| | Parts | | | |
|---|---|---|---|---|
| | A | B | C | Blank |
| Water (city of Birmingham) | 97 | 97 | 97 | 97 |
| Polyvinyl alcohol available as Elvanol 51/05 | 5 | 5 | 5 | 5 |
| Ferrous sulphate, 7H₂O | 0.003 | 0.003 | 0.003 | 0.003 |
| Hydrogen peroxide (130 vol.) | 0.45 | 0.45 | 0.45 | 0.45 |
| Formic acid | 0.16 | 0.16 | 0.16 | 0.16 |
| Vinyl acetate | 100 | 100 | 100 | 100 |
| Spiro compound | 0.1 | 0.3 | 0.4 | |

In each of the four emulsions 10 percent of the monomers was added to the water phase and heat applied until polymerisation commenced. When the internal temperature of the mix reached 74° C. the remainder of the monomers was added over 2½ hours at 74° to 76° C. so that there was very little reflux. The temperature was then raised to 88° C. for 30 minutes.

The resultant emulsions had a total solids content of 51 percent, a viscosity of 1 poise and a particle size in the range of from 0.5 to 1.5 microns, however emulsion C contained some particles of larger size. Films were cast from the four emulsions; only the blank emulsion produced a film which would re-emulsify on wet rubbing. The film obtained from the blank emulsion was soluble in acetone but the remaining films were insoluble in this solvent, swelling being less marked in the films obtained from emulsions B and C than that obtained from emulsion A, containing 0.1 percent of the spiro compound.

Having now described our invention, what we claim is:

1. A copolymer of a vinyl ester and not more than 0.3% based on the total weight of monomers of the condensation reaction product of acrolein with a polyhydric alcohol having at least three hydroxy groups in the molecule.

2. A copolymer according to claim 1 which includes another monomer copolymerizable with the vinyl ester.

3. A method for the production of a copolymer which comprises heating an aqueous emulsion of a vinyl ester and not more than 0.3% based on the total weight of monomers of the condensation reaction product of acrolein with a polyhydric alcohol having at least three hydroxy groups in the molecule.

4. A method according to claim 3 wherein the aqueous emulsion includes another monomer copolymerizable with the vinyl ester.

5. A copolymer according to claim 1 wherein the said vinyl ester is vinyl acetate.

6. A copolymer according to claim 2 wherein the said monomer copolymerisable therewith comprises an alkyl ester of maleic, fumaric, itaconic, acrylic, or methacrylic acid.

7. A copolymer according to claim 1 wherein the said condensation reaction product is obtained by the condensation of acrolein with pentaerythritol.

8. A copolymer according to claim 1 wherein the said condensation reaction product is present to the extent of not more than 0.1 percent of the total weight of monomers.

9. A method according to claim 3 wherein the said aqueous emulsion incorporates a dispersing colloid.

10. A method according to claim 9 wherein the said dispersing colloid is a dextrin.

11. A method according to claim 3 wherein the said aqueous emulsion contains said condensation reaction product in an amount not greater than 0.1 percent of the total weight of monomers.

12. A coating composition which comprises a dispersion of a copolymer according to claim 1.

References Cited by the Examiner

UNITED STATES PATENTS

| 2,467,430 | 4/1949 | Izard | 260—73 |
| 2,808,381 | 10/1957 | Stone | 260—17.4 |
| 3,008,919 | 11/1961 | Guest et al. | 260—73 |

WILLIAM H. SHORT, *Primary Examiner.*

J. NORRIS, *Assistant Examiner.*